March 11, 1924.  
J. H. CLARK  
FAN BELT ADJUSTER  
Filed March 8, 1923  
1,486,729
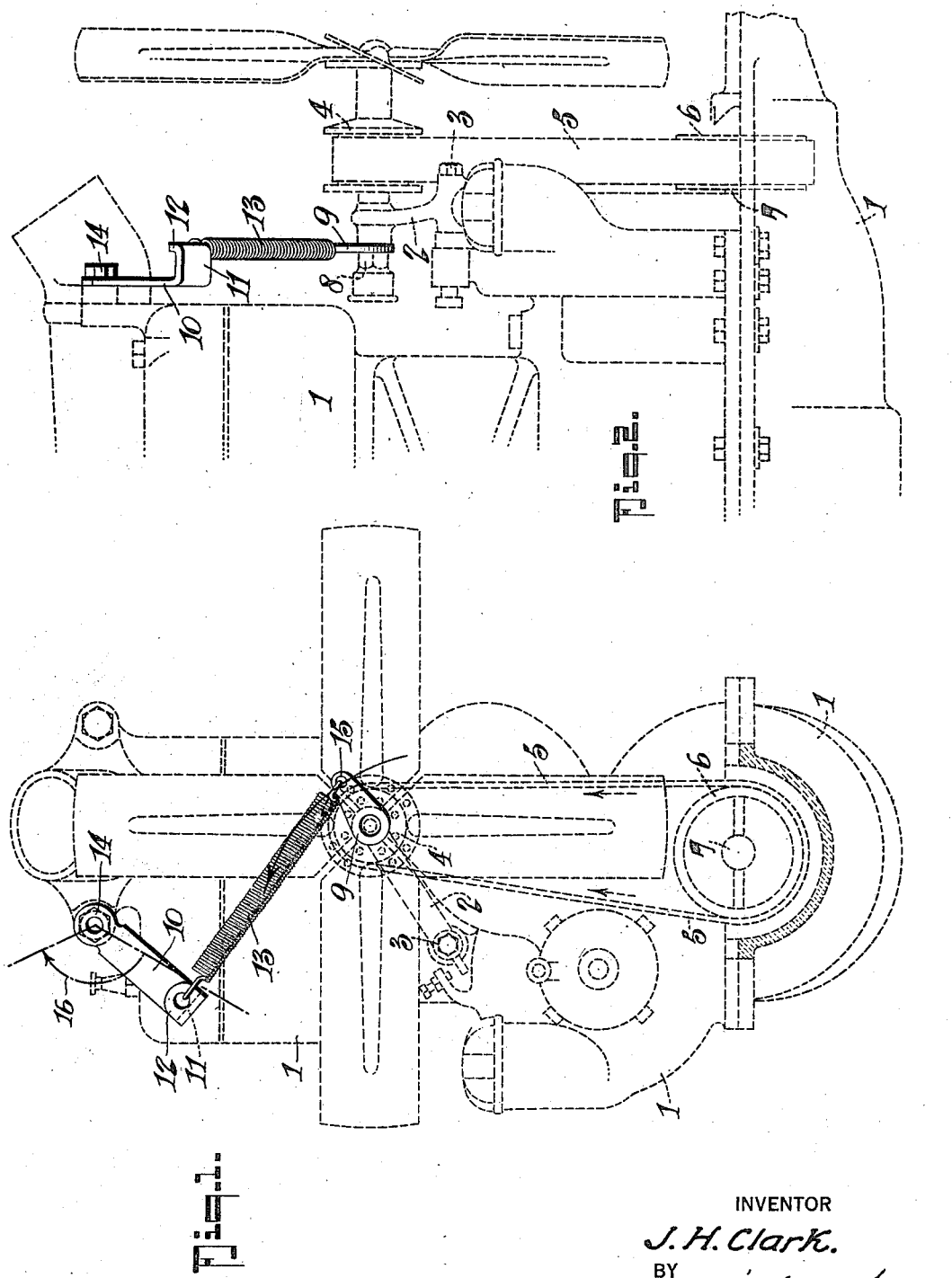
INVENTOR  
J. H. Clark.  
BY  
Albert E. Dieterich  
ATTORNEY Patented Mar. 11, 1924.

1,486,729

UNITED STATES PATENT OFFICE.

JAMES H. CLARK, OF RICHMOND, VIRGINIA, ASSIGNOR TO HENRY J. COHN, OF RICHMOND, VIRGINIA.

FAN-BELT ADJUSTER.

Application filed March 8, 1923. Serial No. 623,748.

*To all whom it may concern:*

Be it known that I, JAMES H. CLARK, a citizen of the United States, residing at Richmond, in the county of Henrico and State of Virginia, have invented certain new and useful Improvements in Fan-Belt Adjusters, of which the following is a specification.

My invention has for its object the provision of a tension means for taking up stretch in fan belts in internal combustion engines and especially those in which the fan is mounted on a pivoted bracket and in which is usually provided a lug and set screw by which the position of the bracket may be manually adjusted to take up belt slack.

In carrying out my invention, I secure to the end of the fan bracket an arm which is connected with another arm secured to the cylinder head by a coil spring which continuously tends to move the bracket on the fan bracket bolt as a pivot and thereby take up slack in the belt as it occurs.

In the drawings, in which I have shown the preferred embodiment of my invention, Figure 1 is a front elevation of the same, the engine and its parts being shown in Figures 1 and 2 in phantom view.

Figure 2 is a side elevation of a portion of an automobile engine with the invention applied.

In the drawing, in which like numerals of reference designate like parts in all of the figures, 1 is the engine, 2 the fan bracket, 3 the fan bracket bolt, 4 the fan pulley, 5 the fan belt and 6 the engine pulley on the end of the crank shaft 7. All of the foregoing parts may be of the usual construction as is also the grease cup and its nut face 8.

My invention consists of a flat plate arm 9 which is secured in place by removing the grease cup 8, slipping the arm 9 on and securing the grease cup 8 back into place, thus rigidly fastening the arm 9 to the fan bracket 2. A second plate arm 10 is secured to the cylinder head by one of the bolts 14 of the top water connection and the arm 10 is bent at right angles at 11 forwardly and then back at 12 to form an ear which is apertured and into which apertured ear one end of the coil spring 13 is hooked, the other end being hooked into an aperture 15 in the arm 9.

It will be seen, by reference especially to Figure 1 of the drawing, that the spring 13, when the parts are properly located, exerts a tension tending to move the fan bracket 2 on the fan bracket bolt 3 as a pivot to take up slack in the belt 5. The tension of the spring 13 may be adjusted by changing the position of the arm 10, adjusting it along the direction of the dot and dash arrow 16.

By the use of my invention it is not necessary to change the construction or do any machine work on the engine as furnished by the manufacturers, but my device can be attached by any one, be he a skilled mechanic or not, by simply removing the grease cup 8 and bolt 14, placing my device in position and restoring the grease cup 8 and bolt 14.

From the foregoing description, taken in connection with the accompanying drawing, it is thought the complete construction, operation and advantages of my invention will be readily apparent to those skilled in the art.

What I claim is:

1. In a fan belt adjustment for motor vehicles, the combination with the pivoted fan bracket, the grease cup of that bracket, and one of the securing bolts commonly used to secure the top water connection with the motor, of an arm plate secured to the fan belt by the grease cup in a manner for permitting arcuate adjustment of the position thereof, a second arm plate adapted to be securely clamped, in a manner for permitting arcuate adjustment of the position thereof, by the said securing bolt of the water connection, and bent out at right angles and back to provide an ear, the said ear being apertured, and a coil spring connecting the said apertured ear and arm plate for the purposes specified.

2. As a new article of manufacture, a fan belt adjuster for the Ford type motor, the said adjuster comprising an apertured arm plate adapted to be securely clamped to the pivoted fan bracket of the motor by the grease cup thereof in a manner for permitting arcuate adjustment, a second apertured arm plate including an angle-bend outwardly positioned apertured ear and adapted to be securely clamped to the water connection of the motor by one of the securing bolts thereof in a manner for permitting arcuate adjustment, and a coil spring secured at opposite ends to the arm plates and adapted, when mounted upon the motor, to automatically tension and take up stretch of the fan belt.

JAMES H. CLARK.